United States Patent [19]

Morimoto et al.

[11] Patent Number: 4,672,470
[45] Date of Patent: Jun. 9, 1987

[54] VIDEO SIGNAL RECORDING AND REPRODUCING APPARATUS

[75] Inventors: Takeshi Morimoto, Osaka; Kunio Sekimoto, Katano; Seigo Asada, Neyagawa, all of Japan

[73] Assignee: Matsushita Electric Industrial Co., Ltd., Osaka, Japan

[21] Appl. No.: 684,286

[22] Filed: Dec. 20, 1984

[30] Foreign Application Priority Data

Dec. 27, 1983 [JP] Japan .................................. 58-250604

[51] Int. Cl.⁴ ........................ H04N 9/81; H04N 9/89
[52] U.S. Cl. .................................. 358/323; 358/334; 360/19.1
[58] Field of Search ........................... 360/36.1, 36.2; 358/310, 323, 326, 337, 320, 334

[56] References Cited

U.S. PATENT DOCUMENTS

| | | | |
|---|---|---|---|
| 3,953,881 | 4/1976 | Yanagimachi et al. | 358/323 |
| 4,034,397 | 7/1977 | Trost | 358/323 |
| 4,084,176 | 4/1978 | Trost | 358/323 |
| 4,422,103 | 12/1983 | Kanamaru | 360/36.1 |
| 4,542,417 | 9/1985 | Ohta | 358/337 |

Primary Examiner—Donald McElheny, Jr.
Attorney, Agent, or Firm—Stevens, Davis, Miller & Mosher

[57] ABSTRACT

A recording and reproducing apparatus for recording a video signal carrying a horizontal sync signal multiplexed with at least one another video signal into a serial mixed signal by compression along the time axis, or for recording such a signal without any compression along the time axis, wherein a pilot signal of a single frequency is superimposed in the horizontal blanking period of at least one video signal, and a clock is generated by use of the pilot signal of the mixed signal at the time of reproduction, thus eliminating time-axis variations appearing through recording and reproduction.

11 Claims, 12 Drawing Figures

VIDEO SIGNAL RECORDING AND REPRODUCING APPARATUS

The present invention relates to an apparatus for recording and reproducing a video signal by compression and multiplex along a time axis.

Most of the current magnetic recording and reproducing apparatus (hereinafter called VTR) are of the helical scan type in which video tracks are formed in an oblique direction on the tape by rotary heads. Especially, small-sized and compact home-VTR's of this type have been developed. In VTR's of the VHS type, for example, the video signal is recorded diagonally across a tape ½ inch wide by a pair of video heads arranged at the angle of 180 degrees to each other on a rotary cylinder 62 mm in diameter. In the area of broadcasting VTRs, on the other hand, there is a great demand for a compact, lightweight, portable VTR for news collection (ENG), and there as been considerable use of ¾-inch VTRs of the U standard. The broadcasting VTR for ENG requires high picture quality as well as compactness and light weight. The ¾-inch U standard VTRs, with a cylinder diameter of 110 mm and tape width of ¾ inches, cannot be reduced in size beyond a certain limit. Also, the video signal is recorded in a format in which the luminance signal is frequency-modulated and the low frequency band is removed and instead a carrier chrominance signal converted to the low frequency band is superimposed thereon. Therefore, the luminance signal and the chrominance signals are both limited in bandwidth and thus fail to fully meet certain broadcasting requirements such as of picture quality FIG. 1 shows a recording pattern of a VTR of the NTSC type of ¾-inch U standard. In FIG. 1, $T_W$, $T_P$, $T_S$ designate the video track width, video track pitch and the space respectively, which are about 85 μm, 137 μm and 52 μm respectively.

In view of these facts, a compact and lightweight apparatus capable of producing a high-quality reproduced picture was suggested (Japanese patent application No. 4819/81) which used a cylinder and a cassette about the same size as those of home VTR, thus making the reduction in size and weight possible as compared with the conventional VTR for ENG.

FIG. 2 is a plan view showing a head arrangement on the cylinder of the VTR of this type, FIG. 3 a front view of the heads thereof, FIG. 4 a diagram showing an example of the recording pattern formed by the heads, FIG. 5 a block diagram of a conventional apparatus having the same recording system with heads, and FIG. 6 shows waveforms produced at essential parts of the apparatus of FIG. 5. The recording system shown in FIG. 5 will be described below.

In FIGS. 2 and 3, characters A, A' and B, B' designate two sets of heads arranged at the angle of 180 degrees to each other at the same height on the cylinder periphery. Characters A, A', B, B' in FIG. 4 designate traces formed by heads A, A', B and B' respectively. In FIGS. 3 and 4, characters $T_A$ and $T_B$ designate the track widths for the heads A(B') and B(B') respectively, $T_P$ the track pitch, and $T_S$ the space. Assume that the diameter and rotational speed of the cylinder, the values of x and y and $T_A$, $T_B$, $T_S$ in FIG. 3, tape speed and the angle of tape to the recording traces are appropriately determined. The traces as shown in FIG. 4 are obtained by the head arrangement shown in FIGS. 2 and 3. It is thus possible to configure, as an example, a VTR having a cylinder of about the same diameter as VTR of VHS type which is capable of recording for about 20 minutes with a VHS cassette.

In a method of recording and reproducing a color video signal with the recording and reproducing apparatus described above, the frequency-modulated luminance signal and the frequency-modulated chrominance signal are recorded with the head A(A') and head B(B') respectively. This method permits a larger track width for the luminance signal and a broad frequency band since the superimposition of the chrominance signal is not required, thus producing a reproduced picture of high signal-to-noise ratio and a high resolution. Further, the base band signals (such as R−Y signal and B−Y signal) for the chrominance signal can be recorded by frequency modulation, and therefore a reproduced signal of high S/N is obtained in a broad band.

In the above-described example, a cylinder of the same diameter as in a VTR of the VHS type can be used with a VHS cassette for recording of about 20 minutes, thus making up an ENG VTR which is compact, lightweight and high in quality.

The recording system shown in FIG. 5 will be explained with reference to FIGS. 4 to 6. In FIG. 5, numeral 1 designates a Y-signal (luminance signal) input terminal, numeral 2 an R−Y signal input terminal, numeral 3 a B−Y signal input terminal, numeral 4 a time axis compressor, numerals 5, 6 frequency modulators, numerals 7, 8 recording amplifiers, numerals 9, 10 video heads, numerals 11, 12 reproducing amplifiers, numerals 13, 14 frequency demodulators, numerals 15, 15' time axis compensators, numeral 16 a Y-signal output terminal, numeral 17 an R−Y signal output terminal, and numeral 18 a B−Y signal output terminal.

In FIG. 6, numerals 1, 2, 3 designate waveforms of input signals Y, R−Y and B−Y respectively (the horizontal sync signal is added also to the R−Y signal for convenience's sake). Numeral 19 designates a waveform of the output signal produced from the time axis compressor 4. These waveforms are produced from the component parts shown in FIG. 5 respectively. The Y signal applied to the Y-signal input terminal 1 is modulated by the frequency modulator 5, amplified by the recording amplifier 7, and recorded on the tape by the head 9. The Y signal has a frequency band of about 4.5 MHz, and the frequency deviation of the modulation is set at 5 MHz to 7 MHz or the like for high-performance signal recording and reproduction. The R−Y signal and B−Y signal applied to the R−Y signal input terminal 2 and the B−Y signal input terminal 3 respectively are compressed along the time axis in the first half and second half of a line (1 H) respectively as shown by the waveform 19 in FIG. 6 by the time axis compressor 4, and are thus combined with each other. The combined signal is modulated at the frequency modulator 6, amplified at the recording amplifier 8, and recorded on the tape by the head 10. The R−Y signal and B−Y signal have a bandwidth of about 1.5 MHz, and therefore the signal obtained by compressing their wavelengths to a half along the time axis has a bandwidth of about 3 MHz. The frequency deviation of this combined signal is set at 3.5 MHz to 5 MHz, for example. FIG. 4 shows a tape pattern recorded with the thus obtained Y signal and the chrominance signal by the two pairs of heads having the above-mentioned construction. In FIG. 4, character A, A' designate a recording trace of the Y signal, and character B, B' that of the chrominance signal. As seen from FIG. 4, the Y signal can be reproduced with a track wider than that for the conventional VHS VTR, and the chrominance signal with a track narrower than that for Y signal at a high S/N, since the FM carrier frequency is low and the bandwidth is about 3 MHz. In reproduction mode, the Y signal reproduced from the head 9 is amplified by the reproduction amplifier 11, demodulated by the frequency modulator 13, and deprived of reproduction jitter specific to the VTR by the time axis compensator 15, thus producing a reproduced Y signal at an output terminal 16. The chrominance signal reproduced from head 10, on the other hand, is amplified by the reproduction amplifier 12, demodulated by the frequency demodulator 14, expanded and deprived of jitter by the time axis compensator 15', and separated into the R−Y signal and B−Y signal, thus producing a reproduced R−Y signal and a reproduced B−Y signal at output terminals 17 and 18 respectively.

In the VTR for performing the above processing of components, the horizontal sync signal superimposed on the video signal is used for detecting the reproduction jitter of the video signal obtained from the magnetic tape.

A conventional example of the time axis compensator 15 is shown in FIG. 7. The input terminal (IN) 21 is impressed with a video signal containing a jitter reproduced from the VTR, and a horizontal sync signal having the jitter information is separated by a horizontal sync signal separator circuit (H SYNC SEP) 22. A phase comparator circuit (PC) 23, a low-pass filter (LPF) 24, a voltage-controlled oscillator (VCO) 25 and an N frequency divider (I/N) 26 make up a PLL 27 (phase locked loop). VCO 25, which is for generating a memory write clock, oscillates at a frequency N times higher than that of the horizontal sync signal produced from H SYNC SEP 22.

When PLL 27 is locked, PC 23 compares phases of the input signals at every horizontal scanning period, and therefore, VCO 25 oscillates at an oscillation frequency following the jitter of the horizontal sync signal separated from H SYNC SEP 22.

An A/D converter (A/D) 28 samples the input video signal at the oscillated clock frequency of the VCO 25 controlled with reference to the jitter to analog-digital convert the sampled signal and write in a memory (MEMORY) 29 at a location addressed with a respective write address by a write address control (WRITE ADDRESS) 30 on the basis of the clock produced by VCO 25.

The timings of reading from the MEMORY 29 and outputting the video signal, on the other hand, are defined by a reference signal oscillator (OSC) 31. Specifically, the read address which is determined by a read address control (READ ADDRESS) 32 based on the reference oscillation frequency of OSC 31 is applied to MEMORY 29, so that the data stored at the address is outputted to an output terminal (OUT) 34 as a jitter-compensated video signal through a D/A converter (D/A) 33.

FIG. 8 shows an example of a conventional time axis compensator 15'. The circuit of FIG. 8, which is configured substantially the same way as FIG. 7, is different from that of FIG. 7 in that there are provided D/A converters 33, 33' and output terminals 34, 34' corresponding to the output terminals 17, 18 shown in FIG. 5. Also, the D/A converters 33, 33' and the read address control 32 shown in FIG. 8 operate with an OSC 31' oscillating at a frequency one half that of OSC 31 shown in FIG. 7. Further, the memory 29 comprises two blocks A and B. For example, the N/2 picture elements for the former half (R−Y signal portion) of a horizontal sync period are written in the block A, and the N/2 picture elements for the latter half (B−Y signal portion) of the horizontal sync period are written in the block B. The data in the blocks A and B of the memory 29 are read out at the same time at a frequency one half that of the write clock, and sent to the D/A converters 33, 33'. As a result of this operation, the R−Y signal and B−Y signal expanded along time axis and free of jitter are produced at the output terminals 34 and 34' respectively.

The block of PLL 27 shown in FIG. 7 and FIG. 8, however, contains various problems. First, in view of the fact that only the horizontal sinc signal is used as information to generate the clock, the signal-to-noise ratio of the horizontal sync signal component applied to the input terminal 21 and the accuracy of the horizontal sync separator circuit 22 influence the residual jitter of the time axis compensator in FIG. 7 and FIG. 8 respectively. Generally, the model of this type is inferior in residual jitter to the time axis compensator in color mode of current 1-inch VTR of direct recording type. This is because the phase information of the burst signal of a composite video signal is also used for the clock generation in color mode of the 1-inch VTR.

A second problem is that the residual jitter described above is expanded and enlarged with the expansion of signal along the time axis in a model having a time axis expander as shown in FIG. 8. Also, since the horizontal sync signals at regular intervals of 63.5S (NTSC) are the only information for clock generation, VCO 25 freely oscillates before the next horizontal sync signal is applied to the phase comparator 23. As a result, it is impossible for the VCO 25 to oscillate as a clock in ideal synchronism with the video signal, the VCO 25 oscillates rather with a phase error and a velocity error. When the time-axis compressed signal shown by numeral 19 in FIG. 6 is applied to the input terminal 21 of FIG. 8, the velocity error causes the clock phase of the VCO 25 to fail to coincide between the start of the R−Y signal and the start of the B−Y signal of the waveform 19, resulting in a color displacement.

According to the present invention, a pilot signal of an appropriate fixed frequency is added to each of the back porches of the horizontal blanking periods of a plurality of video signals, and a horizontal sync signal is added in the horizontal blanking period of only one of the plurality of video signals, and each of the resulting video signals is compressed along the time axis for recording on a recording medium.

In reproduction mode, the reproduced horizontal sync signal is applied to a first PLL to generate a master clock, and a second PLL is provided to cause the master clock phase to coincide with the phase of the pilot signal at the respective back porches of the compressed video signals, so that a stable clock is generated for the time axis compensator thereby to alleviate the problem of the conventional apparatus.

In the case of recording without any time axis compression, on the other hand, the variations along the time axis can be improved by adding a pilot signal to the back porch of the horizontal blanking period as a special case of the aforementioned apparatus.

The present invention will be apparent from the following detailed description taken in conjunction with the accompanying drawings, in which.

In all systems for recording a video signal by compression along the time axis (such as a system in which a couple of color-difference signals are compressed to one half in wavelength), the present invention is applicable in such a manner that a pilot signal of a fixed frequency is superimposed on the video signal for recording thereby to obviate the residual jitter in the reproduction system.

Now, discussion will be made of an embodiment of the present invention as applied to a time axis compression system in which a couple of color-difference signals (R−Y signal and B−Y signal) are respectively compressed to 2/5 of a horizontal scanning period and multiplexed along the time axis to generate a serial mixed signal, and an audio signal compressed along the time axis or otherwise processed is superimposed in the remaining 1/5 of the horizontal scanning period of the mixed signal.

Figure 1:
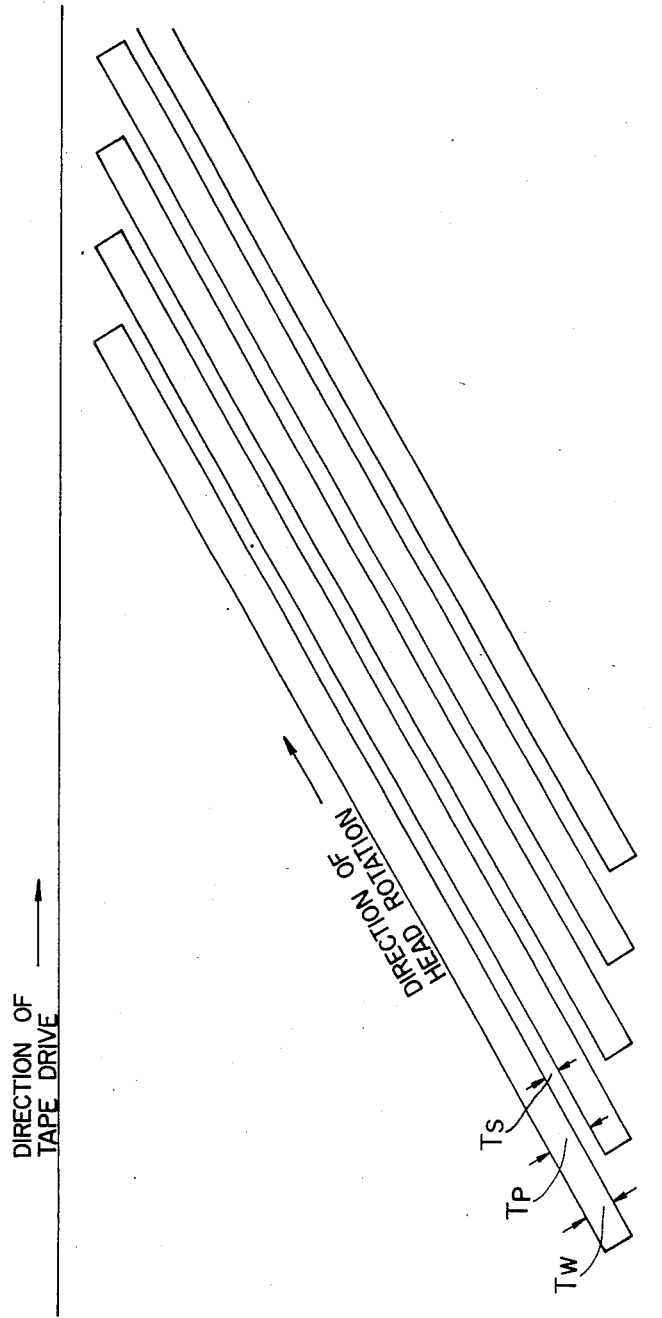
FIG. 1 is a diagram showing a recording pattern of a conventional VTR.
Figure 2:
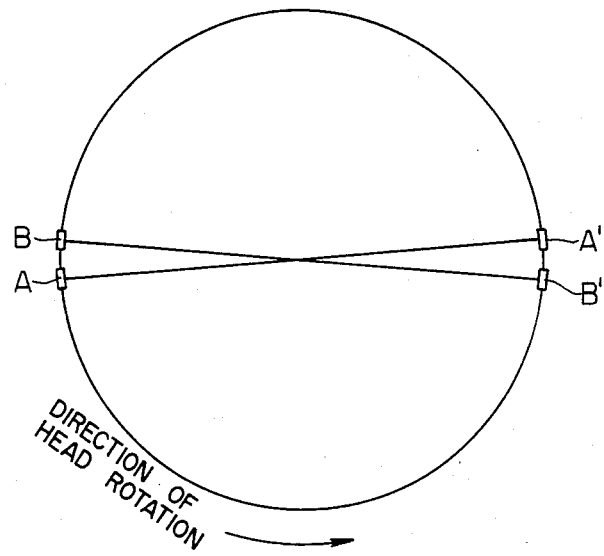
FIG. 2 is a plan view showing a recording-head arrangement of a conventional VTR.
Figure 3:
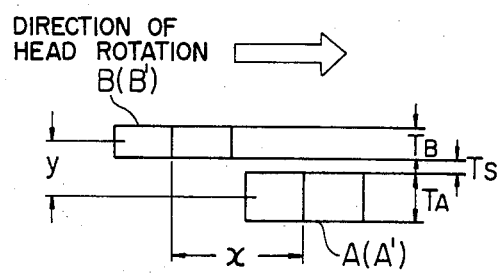
FIG. 3 is a front view of the same VTR head arrangement.
Figure 4:
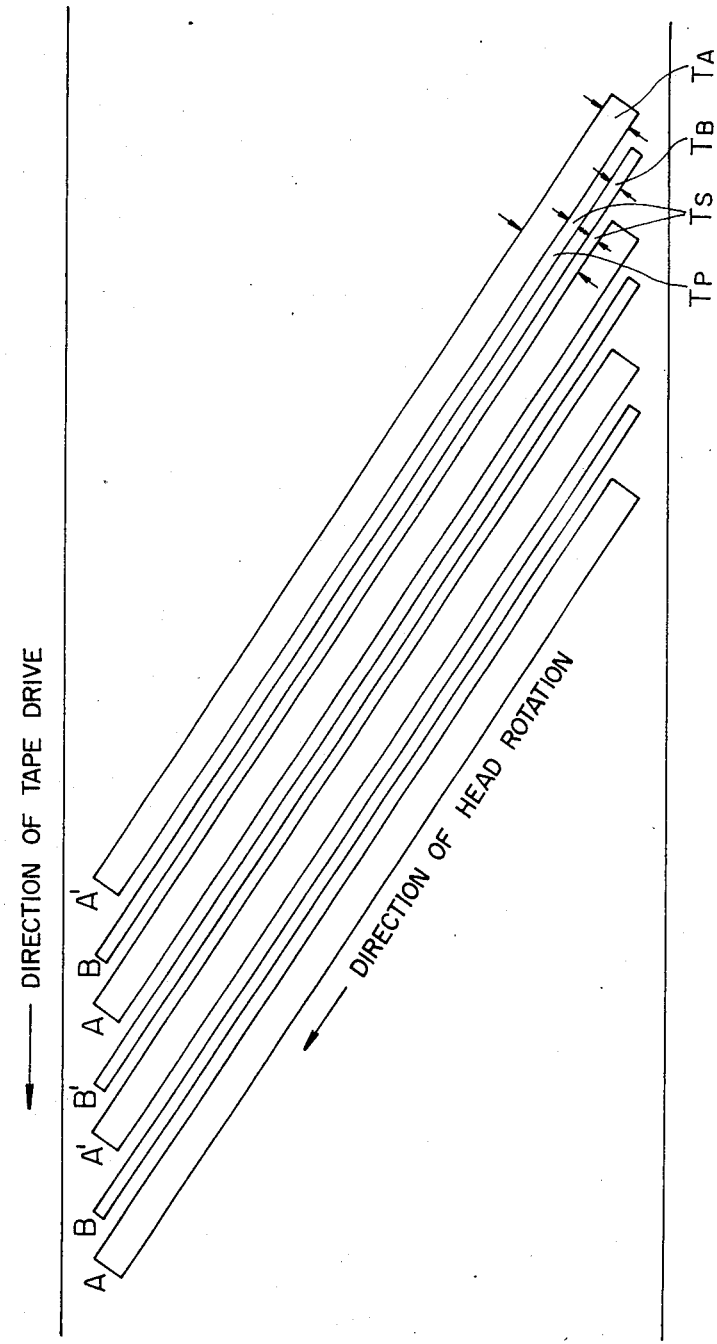
FIG. 4 shows a recording pattern of a conventional VTR.
Figure 5:
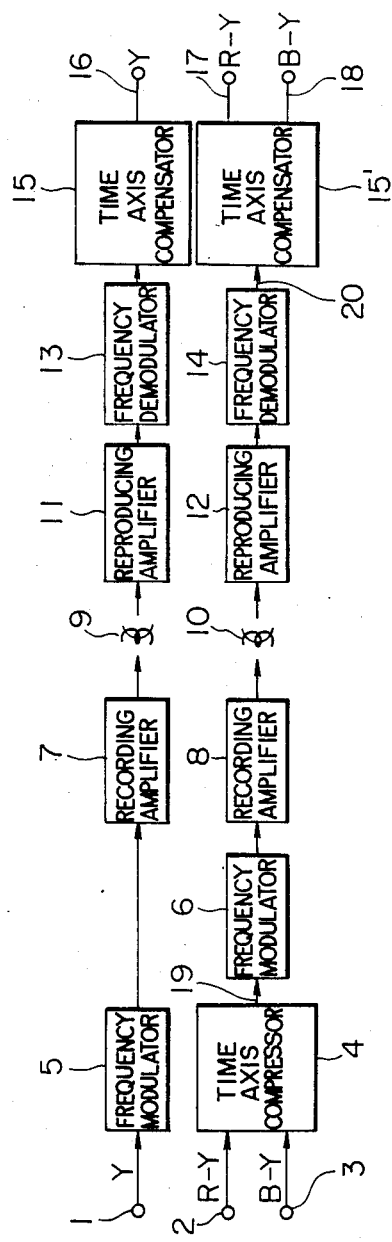
FIG. 5 is a circuit-block diagram of a conventional VTR.
Figure 6:
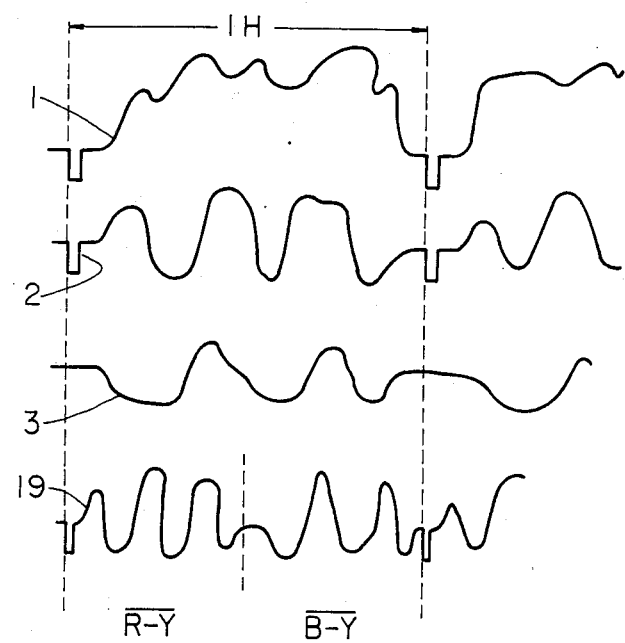
FIG. 6 shows waveforms produced at various parts of the arrangement of FIG. 5.
Figure 7:
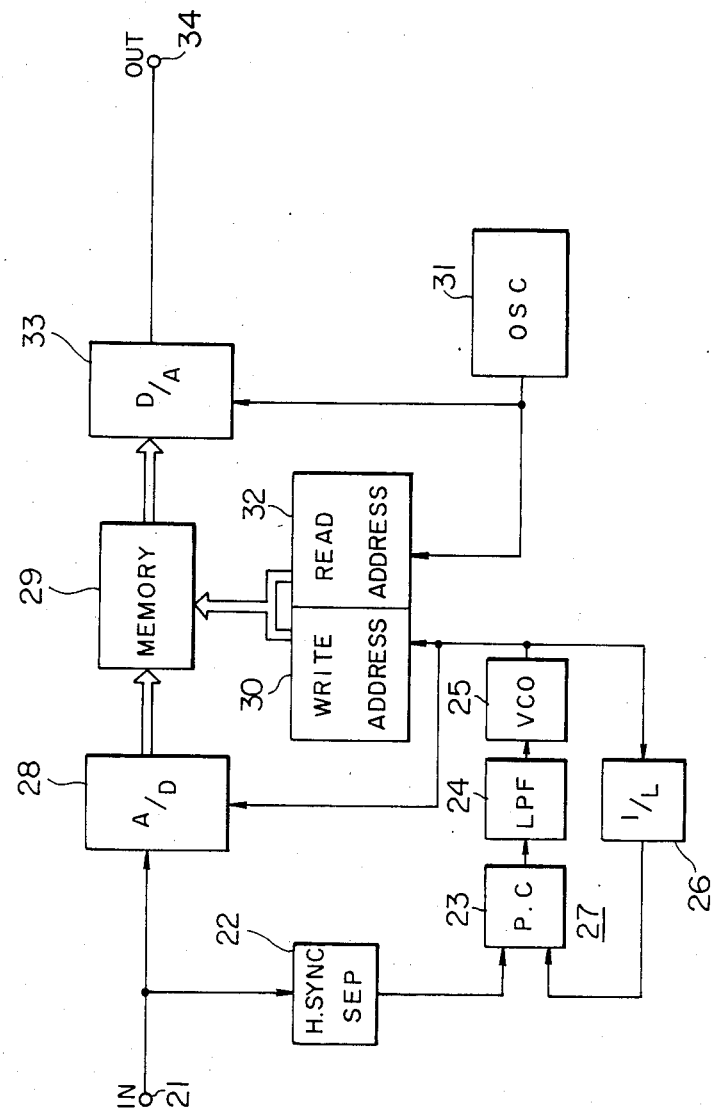
FIGS. 7 and 8 are circuit-block diagrams showing conventional time axis compensators respectively.
Figure 9:
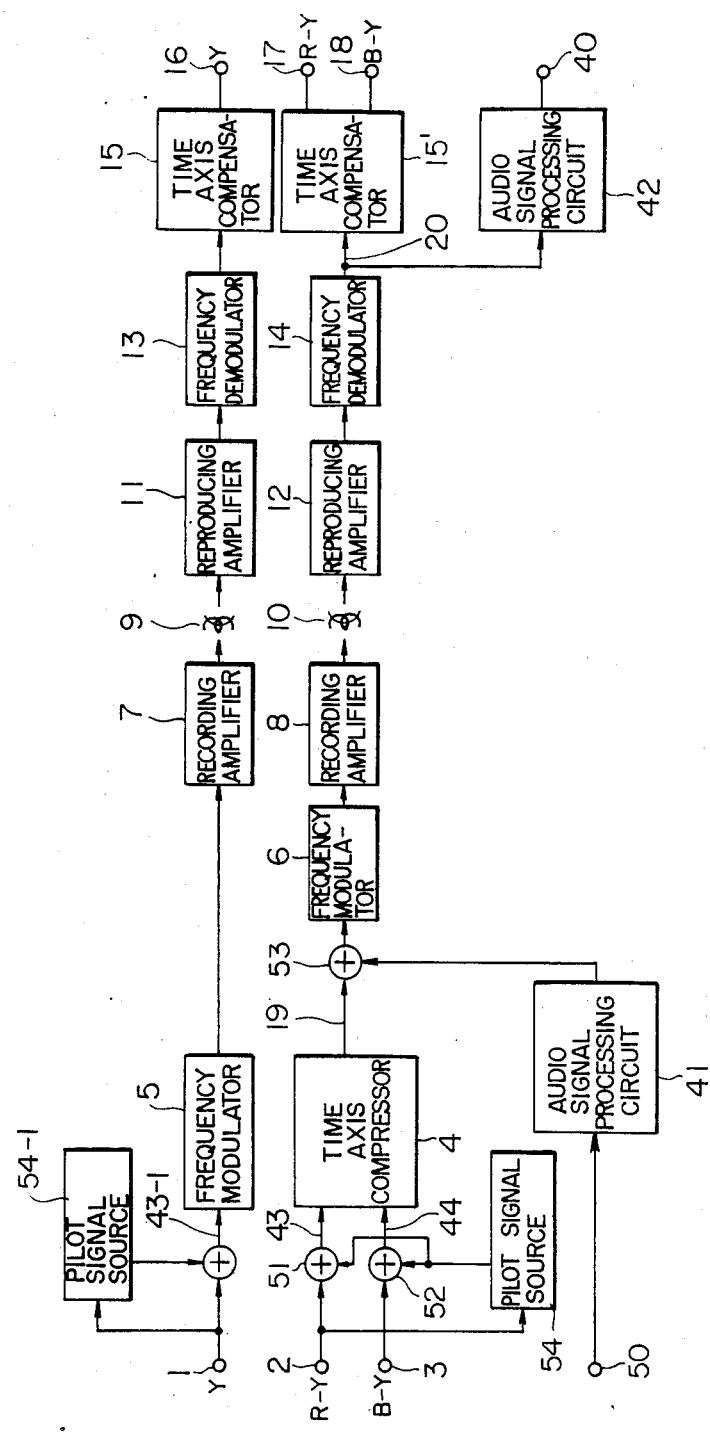
FIG. 9 is a circuit-block diagram showing a recording and reproducing apparatus according to an embodiment of the present invention.
Figure 10:
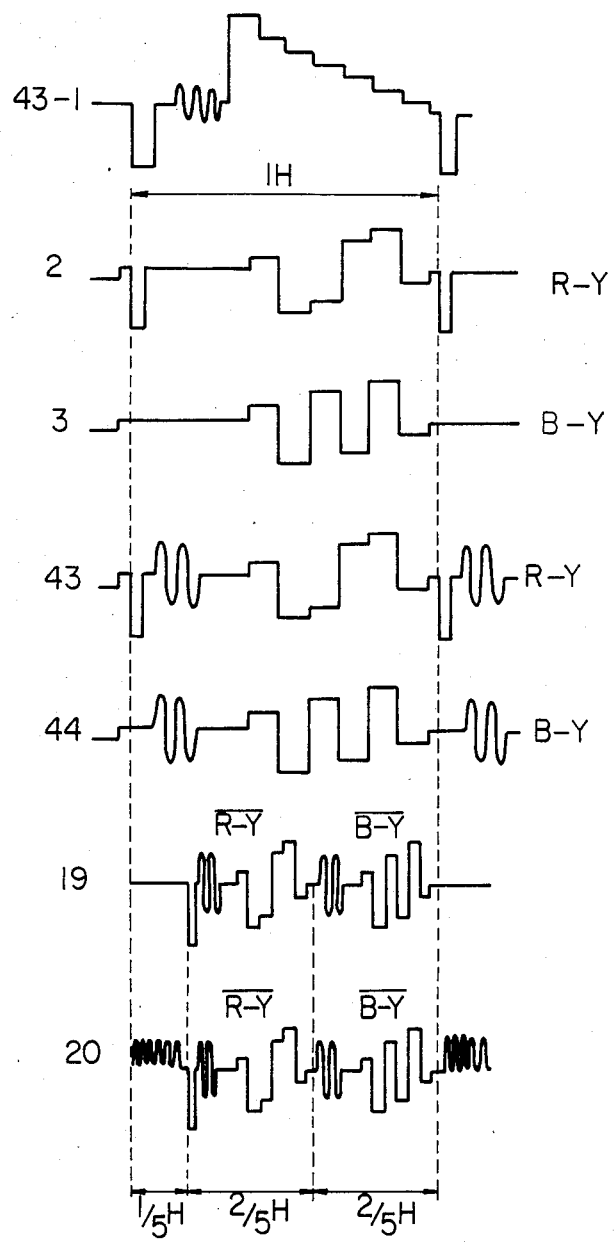
FIG. 10 shows waveforms produced at various parts of the same embodiment.

In FIG. 9 showing a block diagram of an outline of the above-mentioned time axis compression system, those component parts that operate in the same way as the parts of FIG. 4 are designated by the same reference numerals as the latter. Waveforms produced at various parts of FIG. 9 are shown in FIG. 10. The numerals attached to the waveforms indicate the parts at which they are produced in FIG. 9.

The luminance (Y) signal applied to the input terminal 1 is not compressed along the time axis for recording, but added with a pilot signal in the recording system to improve the jitter at the time of reproduction.

Numeral 54-1 in FIG. 9 designates a pilot signal source, where an appropriate frequency pilot signal phase-locked to the horizontal sync signal in the Y signal is superimposed on the back porch of the Y signal by use of a mixer 51-1 and is recorded as a waveform 43-1 in FIG. 10.

The pilot signal source 54-1 generates, only for a predetermined period (such as at the back porch of a couple of color-difference signals), a pilot signal waveform of an appropriate frequency phase-locked to the horizontal sync signal of the R−Y signal applied to the input terminal 2. By mixers 51-1, and 52, this pilot signal is mixed in a predetermined phase relation with the R−Y and B−Y signals applied to the input terminals 2 and 3, and further applied in the waveforms of 43 and 44 shown in FIG. 10 respectively to the time axis compressor circuit 4.

The video signal contains a blanking period for superimposing an audio signal in the first half 1/5H of a horizontal scanning period (1H), the $\overline{R-Y}$ signal obtained by compressing the R−Y signal to 2/5 along time axis is allotted to the next period of 2/5H followed by the remaining period 2/5H where the B−Y signal similarly obtained by compressing the $\overline{R-Y}$ signal along time axis 2/5 is allotted, thereby leading to a waveform as shown by numeral 19 in FIG. 10. The audio signal applied to the input terminal 50 is encoded by PCM or otherwise processed at an audio signal processing circuit 41, and after being compressed along the time axis during the first half 1/5H period of 1H, is multiplexed in the mixer 53. The signal thus multiplexed with the audio signal is applied, through the channel of frequency modulator 6 and the reproduction amplifier 12 and through the frequency demodulator 14, to the time axis compensator 15′ and the audio signal processing circuit 42 as a waveform 20 (FIG. 10). The audio processing circuit 42 is a reverse circuit having the function opposite to the audio processing circuit 41 and restores the signal of the first half 1/5H of the waveform 20 to an audio signal and produces it at the output terminal 40. The time axis compensator 15′, on the other hand, removes the time axis variations (jitter) of the signal from the magnetic reproduction system while at the same time expanding it along the time axis in order to restore and output a couple of color-difference signals (R−Y signal and B−Y signal) to the output terminals 17 and 18.

The frequency of the pilot signal is set to 1/k (k: Integer) of the clock frequency used in the time axis compensator 15′.

Figure 8:
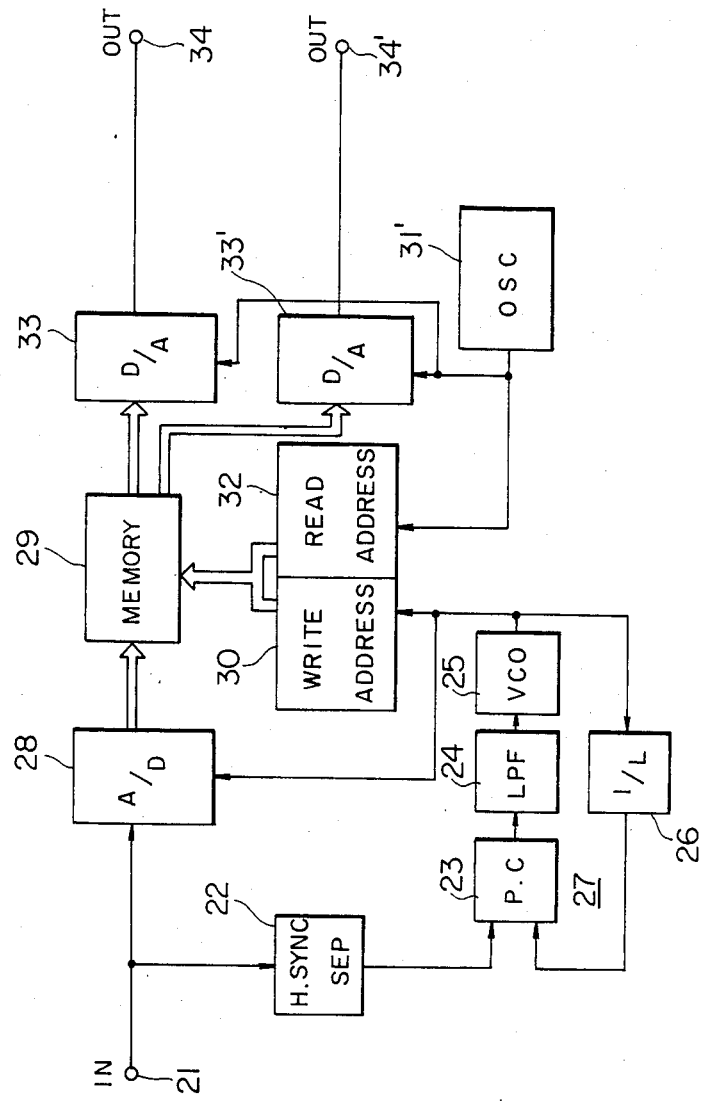
Figure 11:
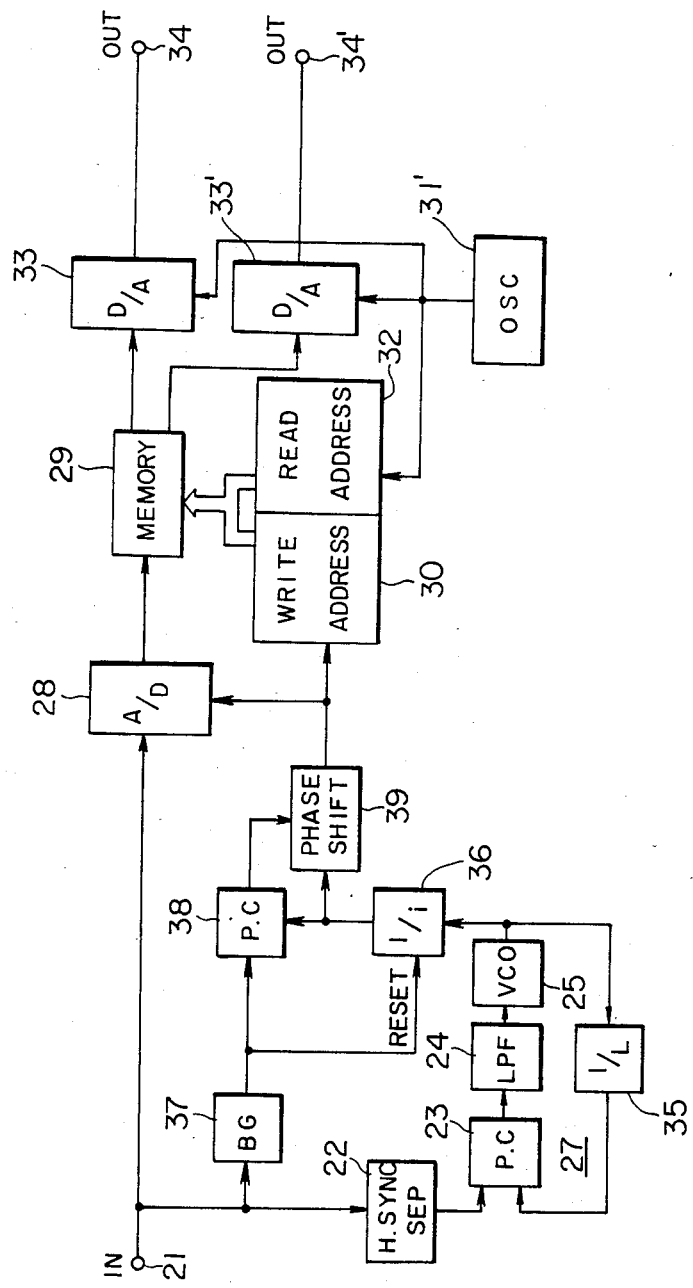
FIG. 11 is a block diagram showing a time axis compensator according to an embodiment of the present invention.

FIG. 11 is a block diagram showing in detail the time axis compensator 15′ used in FIG. 9, which is a modification of the conventional time axis compensator 15′ shown in FIG. 8. The time axis compensator shown in FIG. 11 makes up a first embodiment according to the present invention.

Unlike in FIG. 8 where the write clock is generated only from the horizontal sync signal at PLL 27, the circuit of FIG. 11 is modified to generate a write clock from the horizontal sync signal and the pilot signal.

Explanation of other than the write clock generation will be omitted herein. The component elements with the same reference numerals perform the same operation as those in FIGS. 8 and 11.

The write clock $f_C$ may be of any desired frequency so far as it is synchronized with the horizontal sync frequency $f_H$. It is, however, assumed to be an integral multiple of $f_H$ here for simplification of explanation. In order to set the phase of the write clock $f_C$ by use of the pilot signal as in the present invention, the frequency of the pilot signal is determined at 1/k of the clock frequency.

Also, it is convenient if the frequency $f_M$ of the master clock of VCO 25 is selected at an integral i (i≧3) multiple of the write clock frequency $f_C$. If i=4, for example, the master clock frequency $f_M$ is given as i×J×$f_H$.

In FIG. 11, the video signal compressed along time axis and applied to the input terminal 21 is applied to the horizontal sync signal separator circuit 22 where the horizontal sync signal is picked up so that the master clock frequency $f_M$ is generated at PLL 27.

PLL 27 includes a phase comparator 23, LPF 24, VCO 25 and 1/L frequency divider 35. Since the master clock frequency $f_M$ is given as $i \times J \times f_H$, the constant L of the frequency divider 35 is given as $L = i \times J$.

The video signal applied to the input terminal 21, on the other hand, is also applied to a burst gate (BG) 37 where the pilot information alone is picked up. A 1/i frequency divider 36 is provided for dividing the master clock frequency $f_M$ ($= i \times J \times f_H$) to 1/i to generate a write clock frequency $f_C (= J \times f_H)$. The divider circuit 36 is likely to generate write clock signals of four different phases 90 degrees apart. In order to obviate this phase instability, the 1/i frequency divider 36 is adapted to be reset by the pilot information from BG 37 thereby to set the rise of the write clock produced from the 1/i frequency divider 36 in the closest phase relation to the rise of the pilot signal.

The phase comparator (PC) 38 detects a small phase difference between the write clock and the pilot information produced from BG 37, and supplies the detected phase difference information to the phase shift circuit 39.

On the basis of this phase difference, the phase shift circuit 39 compensates for the phase difference of the write clock produced from the 1/i frequency divider 36 in order for the write clock from the phase shifter 39 always to be in phase with the pilot signal.

In this way, the phase variations of the video signal are removed with the pilot signal as a reference.

A write clock can also be generated for the luminance signal (Y) by the same configuration as in FIG. 11. Since the expansion along the time axis is not required, however, only one D/A conversion system is necessary, and with slightly different write/read address controls 30/32 a time axis compensator 15 of the Y signal system can be configured substantially in the same manner as in FIG. 11.

If the frequencies of the pilot signals to be superimposed have limit conditions as described below, they can hold their phases continuous therebetween such that, assuming a signal not intermittent but continuous to be in phase with a pilot signal to be superimposed in any one superimposed period, the pilot signal of the subsequent superimposed period is also in phase with the continuous signal of the subsequent period. The phase continuity of the pilot signals simplifies the pilot superimposition circuit on the one hand and permits production of the write clock only with reference to the pilot signals on the other hand, resulting in the same advantage as of the first embodiment (FIG. 11). The first embodiment is of course directly applicable for the generation of the pilot frequency determined as mentioned below. The phases of all the pilot signals are continued, and therefore, even if a pilot signal is lacking due to dropouts or the like, a correct clock signal can be obtained by holding the previous clock signals as they are.

1. The frequencies of the pilot signals added to a plurality of video signals $S_1$, ($S_2$ . . . ) before time axis compression are selected at a multiple of an integer $N_1$, ($N_2$, . . . ) of the horizontal sync frequency $f_H$, that is, $N_1 \times f_H$, ($N_2 \times f_H$, . . . ) respectively.

2. In the case where the video signals $S_1$, $S_2$ . . . are compressed by dividing their wavelengths by $K_1$, $K_2$, . . . respectively (for example, $K = 2$ with respect to one signal compressed to ½ in wavelength), the frequencies of the compressed pilot signals $f_{B1} = K_1 \times N_1 \times f_H$, $f_{B2} = K_2 \times N_2 \times f_H$ of the video signals are identical to each other, and $f_{B1} = K_1 \times N_1 \times f_H (f_{B2} = K_2 \times N_2 \times f_H)$ is an integral multiple of the horizontal sync frequency $f_H$.

3. Further, the pilot signal $f_{B1} = K_1 \times N_1 \times f_H$ ($f_{B2} = K_2 \times N_2 \times f_H$) is determined so as to attain reproduction with a high S/N. In the case of VTR shown as a conventional apparatus above, the frequency of about 2 MHz is recommended.

In the case where the time axis compression ratios $K_1$, $K_2$, . . . are expressed respectively by the ratios $K_1 = m_1/l_1$, $K_2 = m_2/l_2$ . . . (i.e., ratios of integers being a prime number to each other), the pilot frequency $f_{B1}$ ($f_{B2}$) is an integral multiple of the horizontal sync frequency $f_H$. Therefore, $N_1$, $N_2$ should be given as a multiple of $l_1$, $l_2$ respectively, with the result that the frequencies $f_{B1}$ ($f_{B2}$) of the compressed pilot signals are expressed as shown below by the integral multiple n of the least common multiple M.

$$f_B = f_{B1} = f_{B2} = n \times M \times f_H \quad (1)$$

In other words, once the signal-distribution ratios in a horizontal scanning period, that is, the time axis compression ratios $K_1$, $K_2$ . . . are determined, the least common multiple M is determined definitely. Then the multiple n is determined by use of the above condition 3.

In this way, once the pilot signal frequency $f_B$ is determined for time axis compression and multiplexing, the integers $N_1$, $N_2$, . . . determining the pilot frequencies added to the respective video signals before the compression are set to $$N_1 = n \times M/K_1 = n \times l_1 \times M/m_1 \quad (2)$$

$$N_2 = n \times M/K_2 = n \times l_2 \times M/m_2 \quad (3)$$

Thus, if the pilot frequencies are set as above, all the added pilot signals have phase continuity. Specifically, assume that for convenience' sake of explanation, a signal of a single frequency which is the same as that of the compressed pilot signals, and that the pilot signal added to the $\overline{R-Y}$ signal of any given horizontal scanning period of the mixed video signal is in phase with the single frequency signal. Then, the pilot signal added to the $\overline{R-Y}$ signal and the pilot signal added to the $\overline{B-Y}$ signal during any of the successive horizontal scanning periods will be in phase with the single frequency signal.

Further, the pilot frequency of the Y signal system can be determined in similar manner. In this case, the time axis compression is not effected, and therefore a calculation can be made as a special case in which the time axis compression ratio $K = 1$. Since the least common multiple M is 1, a given integral multiple of the horizontal sync frequency $f_H$ may be used as the pilot frequency $f_B$.

Figure 12:
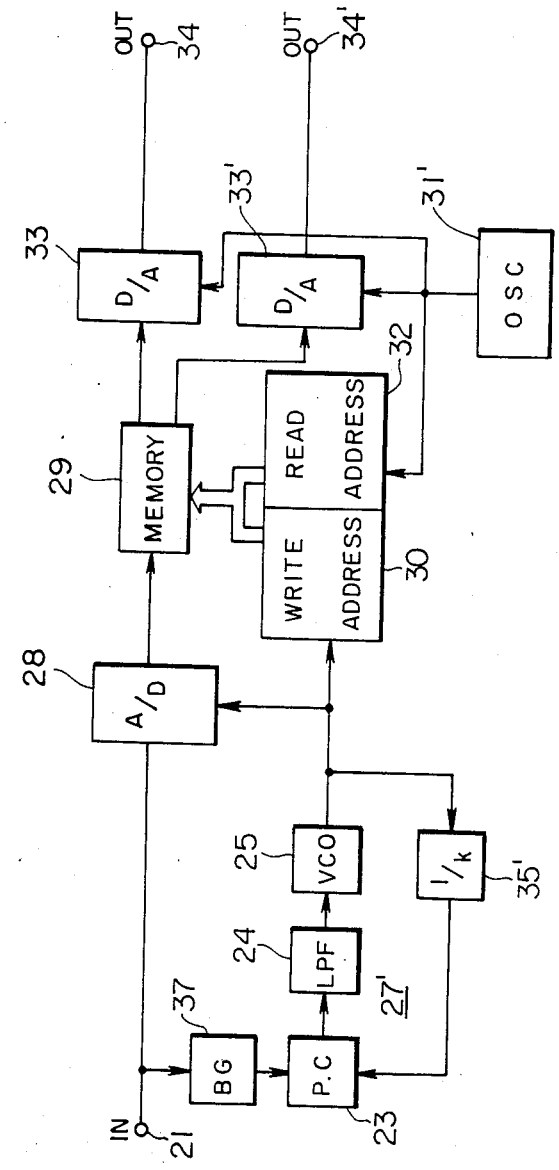
FIG. 12 is a block diagram showing a time axis compensator according to a second embodiment of the present invention.

As described above, the pilot signals have phase continuity, so that a write clock can be generated only from the pilot signals. An example will be explained with reference to a second embodiment of the present invention shown in FIG. 12.

The explanation below will be confined to the portions different from the apparatus of FIG. 11. The mixed video signal is applied to the input terminal 21 from which the pilot signal is picked up at BG 37 and is applied to P.C 23 The other input terminal of the P.C 23 is supplied with a signal from the 1/k frequency divider (1/k) 35'. If PLL 27' is phase-locked, these two signals have the same frequency, and a phase difference signal between the two signals generated by P.C 23 is applied through an LPF 24 to VCO 25. VCO 25, of which the oscillation frequency is controlled by this phase difference signal, is oscillated at a frequency k times higher than the pilot signal.

The pilot signal frequency for the time axis compression system shown in FIG. 9 is determined as explained below by use of the above-mentioned conditions of the pilot signals Since the B−Y and R−Y signals are compressed along the time axis by dividing by 5/2, M=5. For setting the pilot signal frequency for time axis compression is set to about 2 MHz, n is selected at 27, and then the pilot signal frequency $f_B$ is given as $M \times n f_H = 135 f_H$. Specifically, a pilot signal of a frequency of 54 $f_H$ is superimposed before multiplexing by time axis compression as shown in equation (3).

If the value k of the 1/k frequency divider is selected at 8, for instance, the write clock frequency fc is determined as $fc = k \times M \times n \times f_H = 1080 f_H$ is obtained. In view of the fact that horizontal sync frequency $f_H$ is 15.75 KHz, $f_C$ is about 17 MHz, which is considered substantially proper as a sampling clock since the time-axis compressed signal band is about 4 MHz.

By use of a write clock signal source as included in the above-mentioned embodiment, it is possible to converge the residual jitter to such a lower extent that cannot be obtained by a PLL for generating a write clock only with the horizontal sync signal.

Since the in-phase state of the write clock is attained by referring to the pilot signal superimposed on each multiplexed signal, phase unmatching errors of like inconvenience of a plurality of reproduced expansion signals can be obviated, which might otherwise occur due to a velocity error or the like caused in the time axis expansion.

Furthermore, by setting the frequency of the pilot signal as shown by the equations (1), (2), (3), . . . , the pilot signal adder circuit can be simplified on the one hand and the write clock can be easily produced from the pilot signal alone on the other hand.

Another advantage is that a stable write clock generation is possible even if part of the pilot signals is subjected to such a trouble as dropout.

It is also clear that a stable write clock is obtained even in the case where the pilot signal is superimposed on only one of the video signals to be compressed and multiplexed.

In addition, in spite of the explanation of the apparatus shown in FIG. 11 such that the luminance (Y) signal system and the color-difference signal system are separately provided with the respective time axis compensators, it is also possible to apply the master clock $f_M$ of the Y signal system to the time axis compensator of the color-difference signal system and to remove small phase fluctuations by referring to the pilot signals of the respective systems, if the write master clock frequencies $f_M$ of their PLLs 27 are set to the same frequency, in view of the fact that the Y signal and the color-difference signals have substantially the same fluctuations along the time axis. In this way, a single PLL 27 can be commonly used for both systems.

Unlike in FIG. 9 where the pilot signal sources are provided separately, a single pilot-signal source may be employed if the video signals applied to the input terminals 1, 2 and 3 are in phase with each other.

The present invention is not limited to the time-axis compression system shown in the above embodiment, but is applicable with equal effect to time-axis compression system of any compression ratio.

What is claimed is:

1. An apparatus for recording and reproducing a plurality of video signals ($S_1$, $S_2$,--) in and from one track on a recording medium and correcting time axis errors of reproduced video signals, wherein for a recording operation said apparatus comprises:

means for superimposing a pilot signal of a first frequency upon at least one video signal in its horizontal blanking period;

means for superimposing a horizontal sync signal upon one video signal; and means for time axis compressing each of the resulting video signals every predetermined period of time and time-divisionally multiplexing the compressed video signals to form a single composite signal, and, means for recording the composite signal in one track on the recording medium;

and wherein for reproducing the single composite signal and time axis error correction thereof said apparatus comprises:

means for reproducing the recorded video signal from said one track; and time axis correction means comprising write-clock production means for producing a write-clock signal by detecting the pilot signal included in a reproduced single composite signal, memory means for storing said video signal from said one track in accordance with said write-clock signal and readout clock signal production means for producing a clock for reading out the video signal stored in said memory.

2. An apparatus according to claim 1, wherein said pilot signal superimposing means includes means for superimposing the pilot signal upon said at least one video signal in a predetermined phase relation therewith.

3. An apparatus according to claim 1, wherein said time axis compressing and multiplex means comprises:

means for compressing said plurality of video signals ($S_1$, $S_2$ --) by multiplying them respectively by $K_1$, $K_2$ -$K_i$ where $K_i = m_i/1_i$ inclusive of $K_i = 1$, i is an optional integer of from 1 to a number of the video signals, $m_i$ and $1_i$ are prime numbers to each other; and means for time-divisionally multiplexing compressed video signals to thereby form a single composite signal including respective pilot signals of a frequency given by a product $M \times n \times f_H$, where M indicates a least common multiple of $m_1$ to $m_i$, n is an integer and $f_H$ indicates a horizontal sync frequency.

4. An apparatus according to claim 1, wherein said write-clock production means includes means for selecting a frequency of said write-clock signal at an integral multiple of a frequency of the pilot signal included in said composite signal.

5. An apparatus according to claim 1, wherein the plurality of video signals are a luminance signal and two color-difference signals.

6. An apparatus according to claim 1, wherein the plurality of video signals are a luminance signal and a color-difference signal.

7. An apparatus according to claim 1, wherein the plurality of video signals are two color-difference signals.

8. Apparatus according to claim 1, wherein said write-clock production means comprises means for detecting the pilot signal and the horizontal sync signal contained in said composite signal.

9. A recording and reproducing apparatus for time axis compressing and multiplexing two color-difference signals to record in and reproduce from a first track and recording and reproducing a luminance signal in and from a second track on a recording medium, wherein for recording operations said apparatus comprises:

means for superimposing a pilot signal of a first frequency upon the two color-difference signals in their horizontal blanking periods and in a respective predetermined phase relation therewith, means for superimposing a horizontal sync signal upon one of said two color-difference signals;

means for time axis compressing two resulting color-difference signals every predetermined period of time and time-division multiplexing compressed color-difference signals to thereby form a first composite signal, means for recording the first composite signal in the first track, and means for superimposing a pilot signal of a second frequency upon the luminance signal in its horizontal blanking period; and means for recording said superimposed luminance signal in the second track;

and wherein for reproducing operations said apparatus comprises:

means for reproducing the respective recorded signals from the first and second tracks; and time axis correction means for correcting time axis errors of a reproduced composite signal and luminance signal, said correction means comprising write-clock signal production means, memory means for storing said reproduced composite and luminance signals in accordance with said write-clock signal, and read-clock signal production means for producing a clock signal for controlling the reading of signals stored in said memory means, wherein said write-clock production means includes means for detecting the horizontal sync signal from one of the reproduced composite signal and luminance signal, means for detecting the resepctive pilot signals from the reproduced composite signal and luminance signal and means for producing respective write-clock signals from the detected signals.

10. A recording and reproducing apparatus for time axis compressing and multiplexing two color-difference signals to record in and reproduce from a first track and recording and reproducing a luminance signal in and from a second track on a recording medium, wherein for recording operations said apparatus comprises:

means for superimposing a pilot signal of a first frequency upon the two color-difference signals in their horizontal blanking periods;

means for superimposing a horizontal sync signal upon one of said two color-difference signals;

means for time axis compressing two resulting color-difference signals every predetermined period of time and time-divisionally multiplexing the compressed color-differenece signals to thereby form a single composite signal; and means for recording the composite signal in the first track on the recording medium;

means for superimposing a pilot signal of a second frequency upon the luminance signal in its horizontal blanking period;

means for recording the superimposed luminance signal in the second track of said recording medium;

and wherein for reproducing operations said apparatus comprises:

means for reproducing the respective recorded signals from the first and second tracks; and, time axis correction means for correcting time axis errors of the reproduced composite signal and luminance signal, said correction means comrising write-clock production means for detecting the respective pilot signals from the reproduced composite signal and luminance signal to produce respective write-clock signals, memory means for storing the reproduced composite and luminance signals in accordance with said write-clock signals and read clock signal production means for producing a clock signal for controlling the reading of signals stored in said memory means.

11. An apparatus according to claim 10, wherein said write-clock production means comprises means for detecting the horizontal sync signal from one of the reproduced composite signal and luminance signal, means for detecting the respective pilot signals from the reproduced composite signal and luminance signal and means for producing the respective write-clock signals from the detected signals.

* * * * *